(12) United States Patent
Strangfeld et al.

(10) Patent No.: US 7,868,656 B2
(45) Date of Patent: Jan. 11, 2011

(54) HOT PLUG CONTROL APPARATUS AND METHOD

(75) Inventors: Bruce A. Strangfeld, Eau Claire, WI (US); Thomas E. McGee, Eau Claire, WI (US)

(73) Assignee: SGI International, Inc., Fremont, CA (US)

( * ) Notice: Subject to any disclaimer, the term of this patent is extended or adjusted under 35 U.S.C. 154(b) by 0 days.

(21) Appl. No.: 12/463,941

(22) Filed: May 11, 2009

(65) Prior Publication Data

US 2009/0276555 A1    Nov. 5, 2009

Related U.S. Application Data

(63) Continuation of application No. 11/235,493, filed on Sep. 26, 2005, now Pat. No. 7,533,208.

(51) Int. Cl.
*H03K 19/00*     (2006.01)
*H03K 19/02*     (2006.01)

(52) U.S. Cl. .......................... 326/56; 326/86; 710/302

(58) Field of Classification Search ......... 710/300–313; 326/56–58, 82–83, 86
See application file for complete search history.

(56) References Cited

U.S. PATENT DOCUMENTS

| | | | |
|---|---|---|---|
| 5,930,496 A * | 7/1999 | MacLaren et al. | 703/23 |
| 6,141,711 A * | 10/2000 | Shah et al. | 710/302 |
| 6,434,652 B1 * | 8/2002 | Bailis et al. | 710/302 |
| 6,529,987 B1 * | 3/2003 | Reid | 710/302 |
| 6,564,279 B1 * | 5/2003 | Neil et al. | 710/302 |
| 6,704,826 B1 * | 3/2004 | Lam et al. | 710/302 |
| 7,533,208 B2 * | 5/2009 | Strangfeld et al. | 710/302 |
| 2004/0205280 A1 * | 10/2004 | Jeansonne et al. | 710/306 |

* cited by examiner

*Primary Examiner*—James H. Cho
*Assistant Examiner*—Jason M Crawford
(74) *Attorney, Agent, or Firm*—Sunstein Kann Murphy & Timbers LLP

(57) ABSTRACT

An apparatus for controlling a hot plug bus slot on a bus has an input for receiving a set of float signals (i.e., the set may have one or more float signals), and a driver having an output electrically couplable with the bus. The apparatus also has float logic operatively coupled with the input. The float logic is responsive to the set of float signals to cause the output to float at a high impedance in response to receipt of the set of float signals.

20 Claims, 6 Drawing Sheets

HOT PLUG CONTROL APPARATUS AND METHOD

PRIORITY

This patent application is a continuation of U.S. patent application Ser. No. 11/235,493, also entitled "Hot Plug Control Apparatus and Method," filed Sep. 26, 2005, and having the same inventive entity. That application is incorporated by reference in its entirety.

FIELD OF THE INVENTION

The invention generally relates to hot plug devices and, more particularly, the invention relates to controlling system operation to facilitate removal or addition of hot plug devices in a bus slot.

BACKGROUND OF THE INVENTION

Modern computer systems typically have a wide variety of internal electronic devices that communicate across an internal bus system. Among other things, those electronic devices may include memory chips, microprocessors, graphics processors, and power supplies. Many of those electronic devices are mounted to standardized circuit boards (known as "cards") that are removably coupled to the bus system. For example, a microprocessor and accompanying components may be mounted to a peripheral component interconnect card ("PCI card"), which itself is secured to a card slot on a PCI bus.

PCI cards typically are easy to remove from their slots and, in a like manner, may be easily slid into their slots. Accordingly, a person may replace an existing PCI card having an older, less efficient electronic device (e.g., an older microprocessor) by first removing it from the slot, and then inserting into the slot a different PCI card having a newer, more efficient electronic device.

Some computer systems must be completely powered down to replace a card. If not powered down, unanticipated currents and voltages may damage internal electronic components, or harm the person replacing the card. Other computer systems, however, are not powered down to replace cards. Instead, some other systems simply power down only the slot or bus having the card being replaced. Such systems are known in the art as "hot plug" systems. After the card is placed in the slot, the computer should recognize it and operate accordingly. If not, then logic may be added or modified to ensure that the computer system successfully operates the components on the newly added card.

When powering down, some hot plug systems maintain an electrical connection between the bus and corresponding bus controller (also known as a "bus driver," which controls bus operation). Moreover, some such systems cause that connection to have a very low impedance and a ground potential. Undesirably, other electronic devices within such systems may generate spurious signals when they detect a low potential (i.e., ground). In other words, low active devices may produce unintended signals if they detect the low impedance ground. Those undesired signals could disrupt or damage the system.

SUMMARY OF THE INVENTION

In accordance with one aspect of the invention, an apparatus for controlling a hot plug bus slot on a bus has an input for receiving a set of float signals (i.e., the set may have one or more float signals), and a driver having an output electrically couplable with the bus. The apparatus also has float logic operatively coupled with the input. The float logic is responsive to the set of float signals to cause the output to float at a high impedance in response to receipt of the set of float signals.

The driver illustratively is electrically coupled to the bus when it receives the set of float signals. Among other things, the driver includes amplifying circuitry for amplifying signals transmitted toward the bus slot.

In illustrative embodiments, the high impedance is an impedance value that, when the apparatus operates using a given operating voltage, does not permit serial transmission of a current sufficient to turn-on active circuitry coupled with the slot. In related embodiments, the driver output has a transmitting impedance when transmitting signals to the bus, and the driver output has a float impedance when floating. The float impedance is greater than the transmitting impedance.

The apparatus may also have a port for receiving a signal from bridge core logic for transmission to the driver. In that case, the apparatus also may have a feedback loop that directs the signal back toward the bridge core logic when the driver output floats at the high impedance. In some embodiments, the bridge core logic produces the set of float signals for transmission to the input.

In accordance with another aspect of the invention, a method of controlling a hot plug bus controlled by a bus controller first determines that a card on a slot is to be removed. After determining that a card on the slot is to be removed, the method produces a high impedance between the bus controller and the bus. The high impedance electrically isolates the bus controller from the bus.

In some embodiments, the bus controller determines that a card on the slot is to be removed by receiving a signal from a user interface. The signal has data indicating that the card is to be removed. Moreover, the bus controller may have a pull-up resistor switchably coupled with the output of a driver. The output of the driver thus may have a high impedance by electrically isolating the pull-up resistor from the driver output.

In accordance with another aspect of the invention, a bus control system has a bus (complying with a bus protocol) having a slot, a bus controller having logic that controls operation of the bus, and an electrical connection between the bus and the bus controller. The bus controller includes a control module implementing the bus protocol, and a driver for directing signals toward the bus via the electrical connection. The control module has logic that generates a set of float signals having data that causes the electrical connection between the bus controller and bus to have a float impedance. In addition, the electrical connection between the bus controller and bus has a transmit impedance range (i.e., a range of impedance values, or a single value-a range with a zero deviation) when transmitting signals toward the bus. The float impedance is greater than the transmit impedance range to electrically isolate the bus controller from the bus.

In some embodiments, the bus control system also has a signal receiver for receiving signals from the bus via the electrical connection, and a multiplexer having an output electrically coupled with the control module. The multiplexer also has an input electrically coupled with the driver and signal receiver.

BRIEF DESCRIPTION OF THE DRAWINGS

The foregoing advantages of the invention will be appreciated more fully from the following further description thereof with reference to the accompanying drawings wherein.

DESCRIPTION OF ILLUSTRATIVE EMBODIMENTS

In illustrative embodiments, float logic selectively causes the output node of a bus controller to float at a high impedance during a card swap from a bus slot. Under anticipated operating voltages, such a high impedance does not permit serial transmission of a current sufficient to turn-on active circuitry in the card. For example, if an active device requires a turn-on current of 5 milliamps, a high impedance in the line prevents serial transmission of currents of at least 5 milliamps and greater. Details of illustrative embodiments are discussed below.

Figure 1:
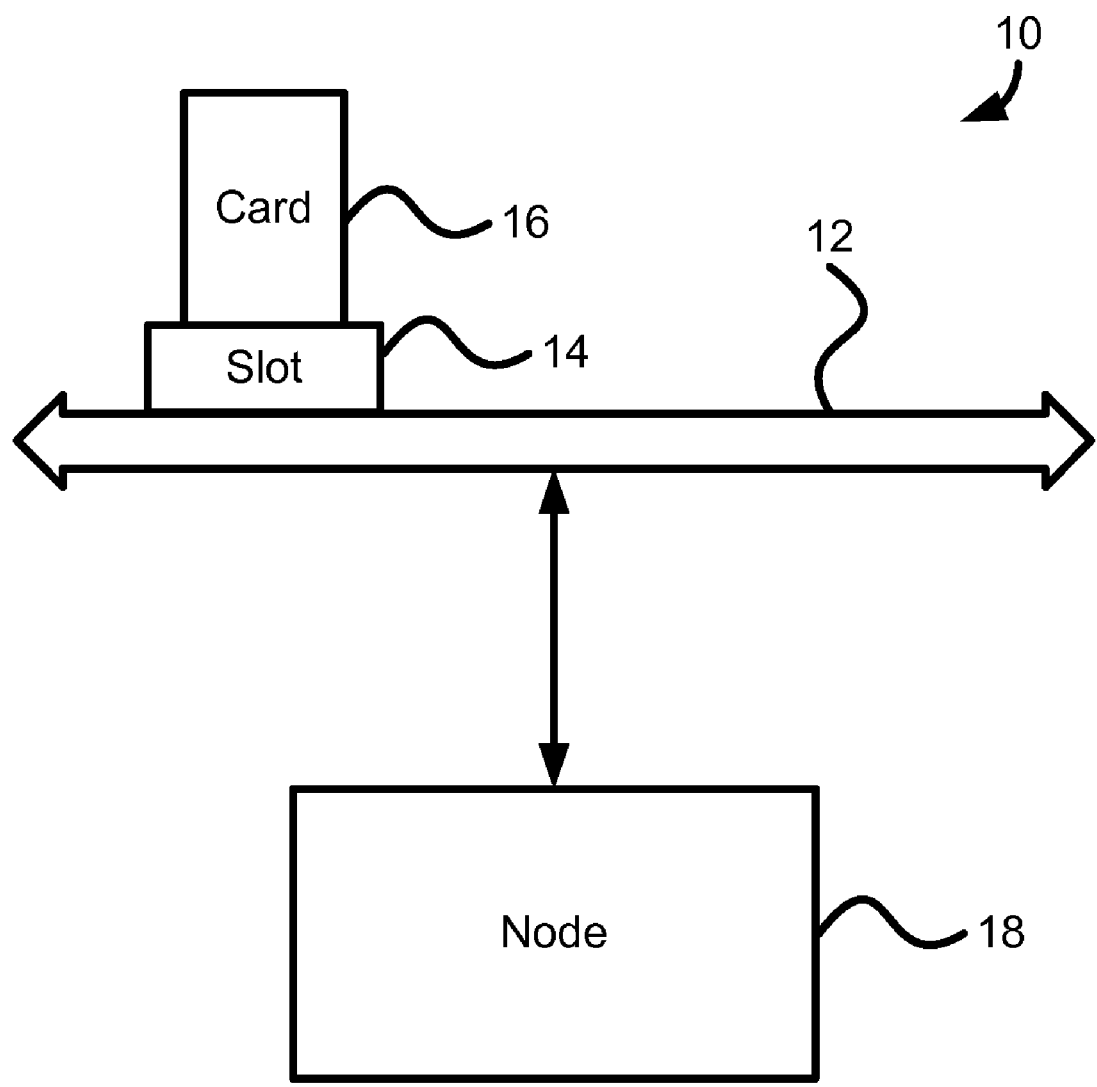
FIG. 1 schematically shows a portion of a computer system upon which illustrative embodiments of the invention may be implemented.

FIG. 1 schematically shows a portion of a computer system 10 upon which illustrative embodiments of the invention may be implemented. The computer system 10 has a bus 12 with a single slot 14, a computer card 16 coupled with the slot 14, and a computer node 18 having logic for executing computer processes (see FIG. 2, discussed below). Among other things, the card 16 has one or more electronic devices, such as a graphics processor or networking chip, that cooperate with the node 18 to perform one or more prescribed functions.

In illustrative embodiments, the bus 12 and card 16 comply with the well known Peripheral Component Interconnect standard ("PCI" standard). Of course, discussion of the PCI standard and the specific configuration shown in FIG. 1 is illustrative and not intended to limit various aspects of the invention. For example, the bus 12 can implement other bus standards. As another example, the computer system 10 may have multiple nodes. Accordingly, those in the art can organize the system into other configurations and still implement illustrative embodiments of the invention. As yet another example, although one slot 14 is shown, some embodiments apply to multi-slotted busses. In some such cases, additional isolation circuitry may be used.

Figure 2:
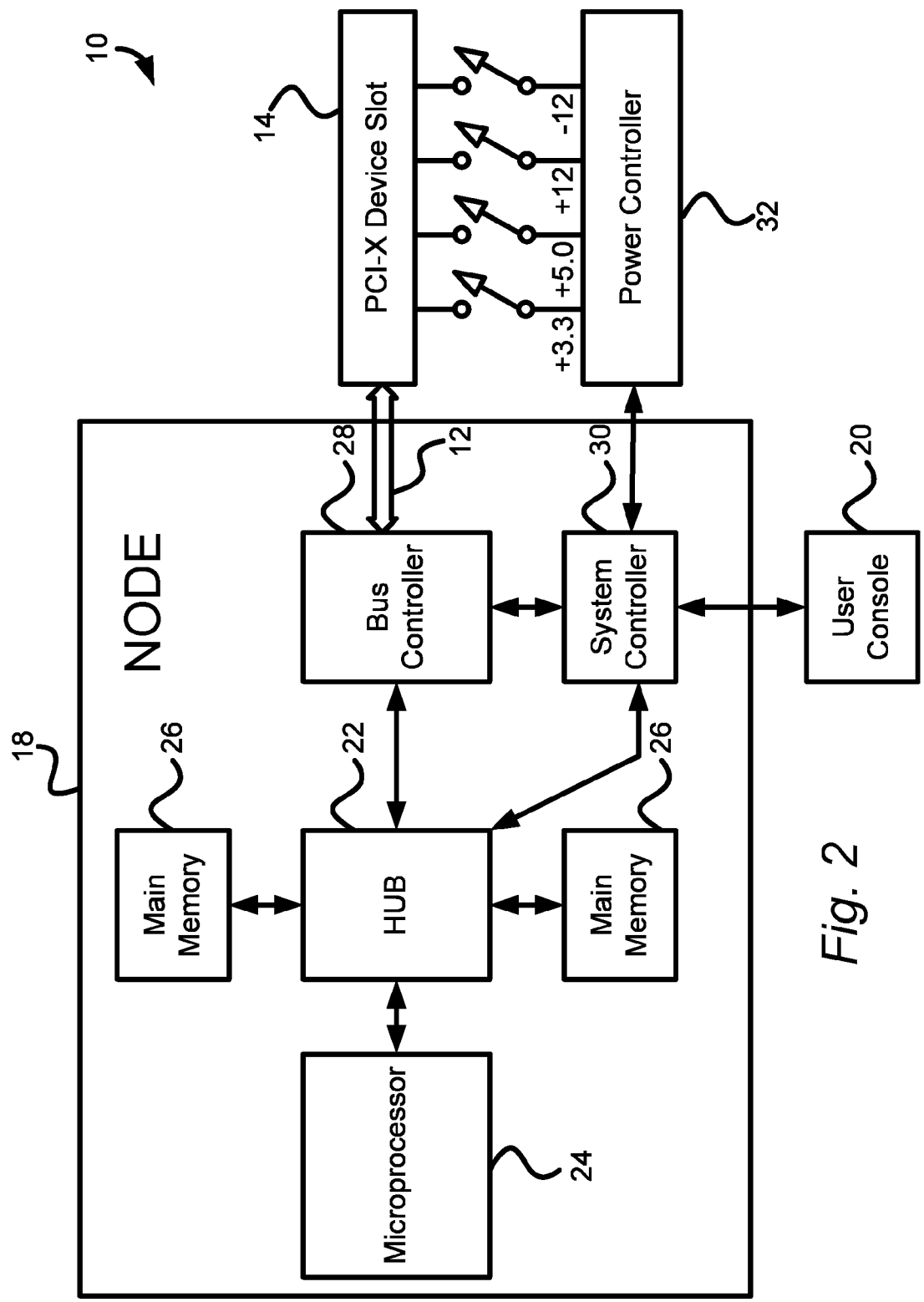
FIG. 2 schematically shows additional details of the computer system shown in FIG. 1.

FIG. 2 schematically shows additional details of the computer system 10 shown in FIG. 1. Again, and a manner similar to FIG. 1, the details of FIG. 2 are presented as an example only. Accordingly, those skilled in the art could modify various components shown in FIG. 2 to accomplish the intended functions of various embodiments of the invention.

Specifically, FIG. 2 shows the node 18 coupled with the bus 12 and a user console 20. The user console 20 provides an interface to control various facets of card swapping. For example, the interface may enable an operator to power down the slot 14 to remove the card 16 (see FIGS. 5 and 6 for details relating to the process of replacing the card 16).

The node 18 has a plurality of components coordinated by a HUB ASIC 22 (application specific integrated circuit). In illustrative embodiments, the HUB ASIC 22 is a gate array chip customized to perform any of a plurality of functions, such as that noted immediately above. The HUB ASIC 22 also may include a microprocessor instead of, or in addition to, the gate arrays.

The components coupled with the HUB ASIC 22 include one or more microprocessors 24 for generating data words (among other things), memory 26 for storing the data words, and a bus controller 28 for controlling interaction with the bus 12. In illustrative embodiments, the microprocessors 24 include two ITANIUM microprocessors 24 (distributed by Intel Corporation of Santa Clara, Calif.) that generate 128 bit words for storage in a plurality of dual in-line memory modules (the memory 26, also known as "DIMMs"). The DIMMs illustratively have X4-type random access memory chips (e.g., DRAM chips) for storing data generated by the microprocessors 24.

The HUB ASIC 22 also couples with a system controller 30 that communicates with 1) the user console 20, and 2) a power controller 32 that selectively powers the slot 14. As discussed below, receipt of commands generated in response to data entered in the user console 20 causes the system controller 30 to generate corresponding messages to the power controller 32. For example, prior to removing the card 16, a user may enter commands (via the user interface) to power down the slot 14. After receiving these commands, the system controller 30 responsively generates corresponding commands to the power controller 32, which consequently disconnects the slot 14 from the power source. Details of this process are discussed below with regard to FIGS. 5 and 6.

Figure 3:
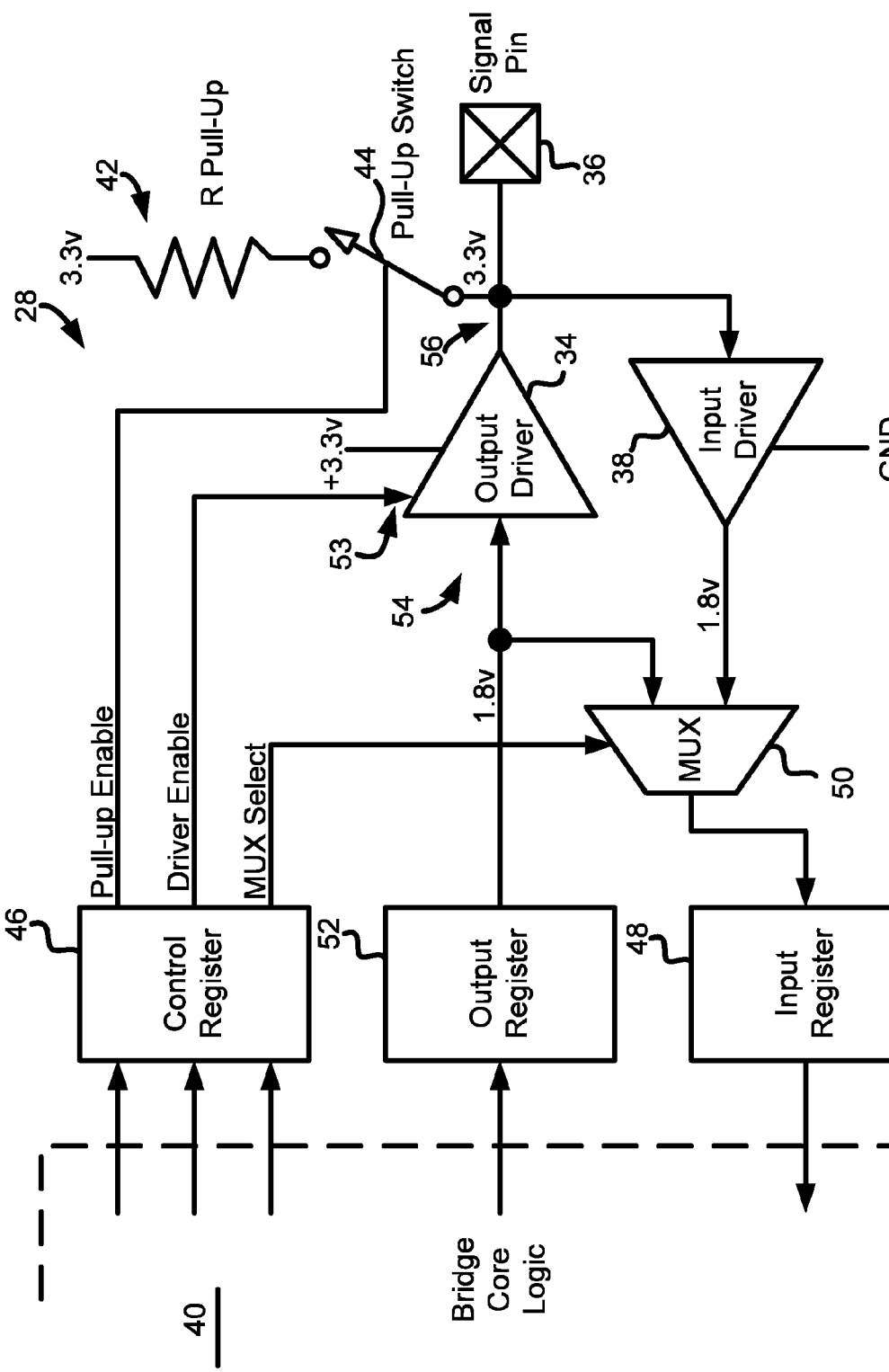
FIG. 3 schematically shows additional details of one bus controller that may implement illustrative embodiments of the invention.

FIG. 3 schematically shows additional details of the bus controller 28 shown in FIG. 2. In illustrative embodiments, the bus controller 28 is implemented as a single ASIC. Other embodiments, however, may implement the functionality across various devices and components.

More specifically, the bus controller 28 includes an output driver 34 for transmitting data to the bus 12 via a signal pin 36, and an input driver 38 for transmitting data received from the bus 12 toward bridge core logic 40 implementing the bus protocol (e.g., the bridge core logic 40 could implement the PCI bus protocol). In addition to the enhanced logic discussed herein, the bridge core logic 40 may have functionality conventionally used by any of a wide variety of bridge/bus controllers used for these purposes. For example, the bridge core logic 40 may implement the PCI standard (as discussed by example) or a bus protocol other than the PCI standard.

The bus controller 28 also has a pull-up resistor 42 connected to the output 56 of the output driver 34 by means of a switch 44. In some embodiments, rather than be a part of the bus controller 28, the pull-up resistor 42 is at some external location (e.g., at the board level). The pull-up resistor 42 and output impedance of the output driver 34 directly impact the output impedance of the entire bus controller 28. As discussed in greater detail below, illustrative embodiments control these impedances to effectively isolate the bus controller 28 at specified times (e.g., when switching the card 16).

The bus controller 28 also includes a plurality of registers 46, 48, and 52 for temporarily storing data transmitted between the drivers 34 and 38 and the bridge core logic 40. Those registers 46, 48, and 52 include a control register 46 that receives the following from the bridge core logic 40:

a) data for selectively enabling and disabling the output driver 34, b) data for selectively enabling and disabling the pull-up resistor 42, and c) selection data for selectively permitting data to be transmitted to the bridge core logic 40.

FIG. 3 shows each of these three types of data as an input arrow into the control register 46. Of course, those skilled in the art should understand that such a representation is schematically only. Accordingly, the control register 46 could receive the data by any conventional interface means, such as through one, two, or three input interfaces capable of receiving many bits of data (e.g., 32 bit words). In a similar manner, FIG. 3 schematically shows three transmission lines that deliver this data and thus, should not be construed to limit various aspects of the invention.

Input data to be forwarded to the bridge core logic 40 is temporarily stored in a second of the two registers; namely an input register 48. A multiplexer 50 electrically positioned between the various registers and drivers controls the flow of data into the bridge core logic 40. The third register shown in FIG. 3 simply is an output register 52 for temporarily storing data to be forwarded from the bridge core logic 40 to the output driver 34 and, ultimately, to the bus 12 and card 16.

Figure 4:
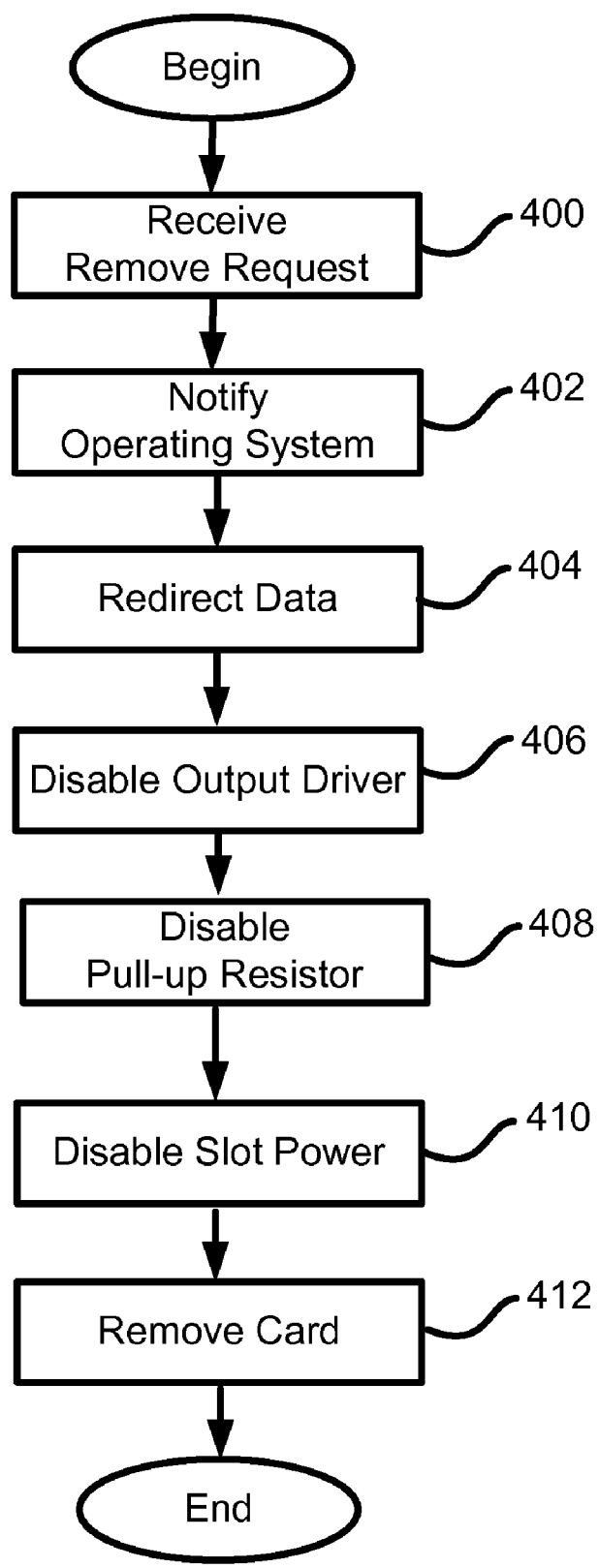
FIG. 4 shows a process of removing a card from a slot in accordance with illustrative embodiments of the invention.

FIG. 4 shows a process of removing the card 16 from the slot 14 in accordance with illustrative embodiments of the invention. The process begins at step 400 by receiving a request to remove the card 16 from the slot 14. To that end, an operator may enter data into the various fields of a customized graphical user interface on the user console 20. For example, the graphical user interface may have a series of interactive slides that guide the user through the card swapping process. Among other things, the series of slides may request information about a new card to be inserted, and notify the operator of the appropriate time to physically remove the card 16 from the slot 14.

One or more software programs executing somewhere in the system both generate the user interface, and messages having data/commands indicating that the card 16 is to be removed. The method then continues to step 402 by notifying the operating system. In response, the operating system permits pending actions to finish before powering down the slot 14. To begin the powering down process, the operating system also forwards related messages to the bridge core logic 40 on the bus controller 28.

The bridge core logic 40 responds by redirecting data to back to itself (step 404), and disabling the output driver 34 (step 406). Both steps can be completed substantially concurrently, or in the order noted. To redirect data (step 404), the bridge core logic 40 forwards selection data to the multiplexer 50 via the control register 46. The selection data correspondingly changes the default multiplexer setting from a) the output of the input driver 38 to b) the line connecting to the input line 54 of the output driver 34. As a result, the process effectively forwards data remaining in the output register 52 back to the bridge core logic 40 via the input register 48. Until changed back to its default state, the multiplexer 50 continually forwards data intended for the output driver 34 back to the bridge core logic 40 (by means of this loop). In illustrative embodiments, the bridge core logic 40 does not generate such data after the process begins. In other embodiments, however, the bridge core logic 40 may continue to generate such data.

To disable the output driver (step 406), the bridge core logic 40 forwards a disable message to the control register 46, which is received by an enable port 53 of the output driver 34. After receiving the disable message, the output driver 34 no longer forwards data to the card 16 and thus, is considered to be "disabled." When disabled at this stage of the process, the output impedance of the bus controller 28 is that of the pull-up resistor 42.

Figure 5:
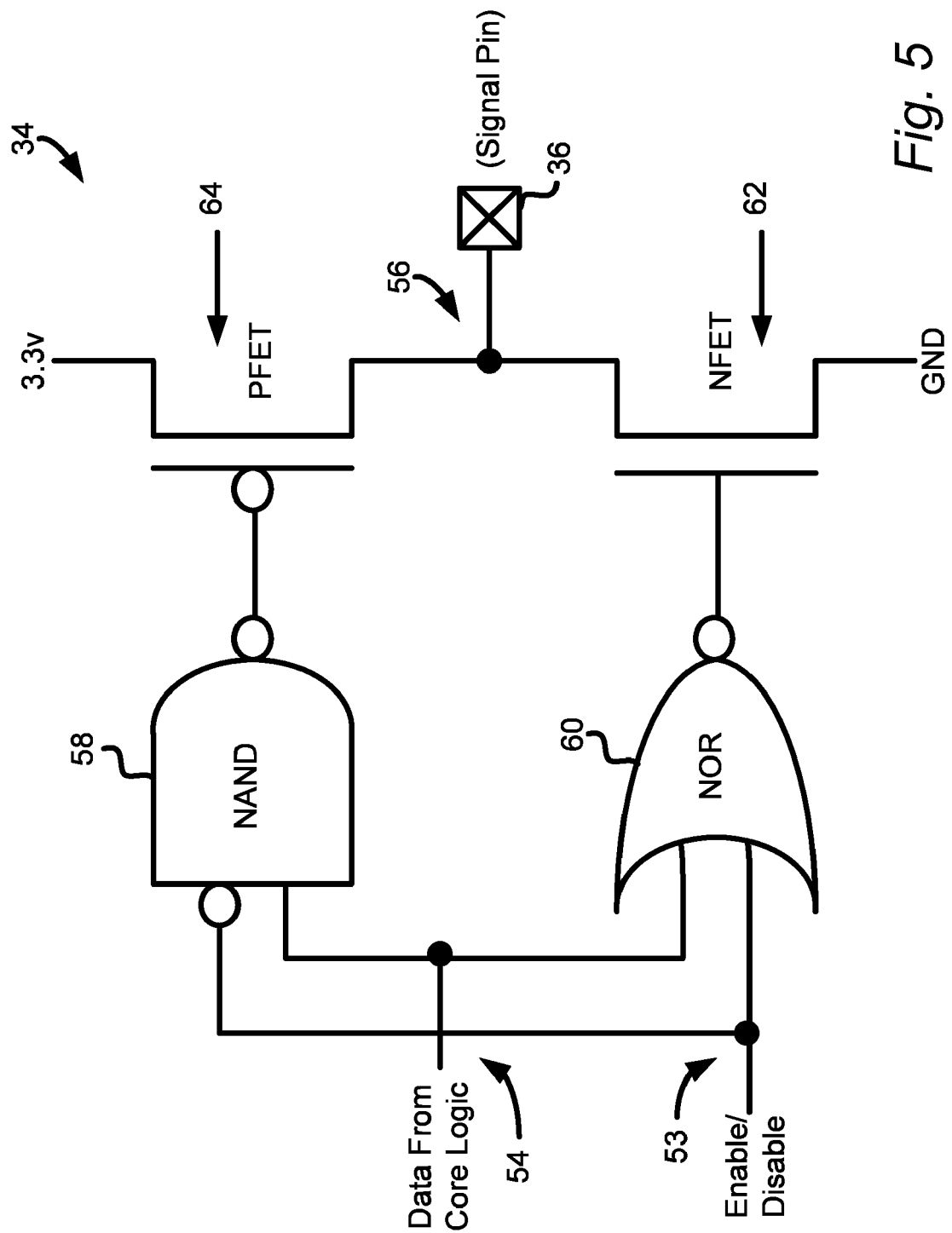
FIG. 5 schematically shows additional details of the driver shown in FIG. 3.

FIG. 5 shows a driver configuration that facilitates understanding of the process of disabling and enabling the output driver 34 (i.e., step 406). In particular, FIG. 5 schematically shows a simplified schematically diagram of the output driver 34 configured in accordance with illustrative embodiments of the invention. As shown, the output driver 34 has an input line 54 for receiving data from the bridge core logic 40, and the above noted enable port 53 for receiving enable and disable data from the bridge core logic 40 via the control register 46. Both inputs 53 and 54 are coupled to a pair of logic gates 58 and 60 that selectively enable and disable a corresponding pair of amplifying transistors 62 and 64.

The pair of logic gates 58 and 60 includes a NAND gate 58 and a NOR gate 60. The NAND gate 58 has an inverting input for receiving an enable or disable message, and a non-inverting input for receiving data from the bridge core logic 40. In a corresponding manner, the NOR gate 60 has a first non-inverting input for receiving an enable or disable message, and a second non-inverting input for receiving data from the bridge core logic 40.

The outputs of the logic gates 58 and 60 each connect to one of the two amplifying transistors 62 and 64. The amplifying transistors 62 and 64 amplify voltage on the input line 54 into a higher voltage, as required by the particularities of the circuit. For example, if the data input line 54 of the output driver 34 receives a 1.8 volt DC signal, then the two amplifying transistors 62 and 64 may cooperate to produce a 3.3 volt DC signal at the output 56 of the output driver 34.

In illustrative embodiments, the amplifying transistors include a P-channel MOSFET 64 having an inverting input to its gate, and an N-channel MOSFET 62 having a non-inverting input to its gate. The output of the NAND gate 58 electrically couples with the input of the P-channel MOSFET 64, while the NOR gate 60 electrically couples with the input of the N-channel MOSFET 62. The two MOSFETs 62 and 64 share a single circuit node that is coupled with a signal pin. As noted above, the signal pin 36 couples with the bus 12 to provide electrical communication.

Table 1 below shows the state of the two MOSFETs 62 and 64 after receipt of specific inputs, as well as the output impedance of the output driver 34 in such states. The column labeled "Enable/Disable Signal" indicates the state of the disable/enable signal, where a logical "0" represents a value that enables the output driver 34, while a logical "1" represents a value that disables the output driver 34.

TABLE 1

| Data | Enable/Disable Signal | P-Channel MOSFET 64 | N-Channel MOSFET 62 | Output Impedance of the Output driver 34 |
|---|---|---|---|---|
| 0 | 0 | OFF | ON | LOW |
| 1 | 0 | ON | OFF | LOW |
| 0 | 1 | OFF | OFF | HIGH |
| 1 | 1 | OFF | OFF | HIGH |

Accordingly, as noted above, if the enable/disable message is set to logical "1," the output impedance of the output driver 34 is high. It should be reiterated that at this point of the process, the output impedance of the entire bus controller 28 is that of the pull-up resistor 42 (not the output impedance of the output driver 34).

Returning to FIG. 4, the process continues to step 408, which disables the pull-up resistor 42. To that end, the bridge core logic 40 forwards an open signal to the switch 44, causing it to open, effectively removing the pull-up resistor 42 from the circuit. It is at this point in the process that the output impedance of the bus controller 28 is considered to be high—an impedance that effectively electrically isolates the bus controller 28 from the bus 12. As noted above, under anticipated operating voltages, such a high impedance does not permit serial transmission of a current sufficient to turn-on active circuitry. For example, in some applications, the output impedance of the output driver 34 (and thus, the bus controller 28) may be on the order of about 90-100 kilo-ohms or greater (e.g., one mega-ohm). By definition, this high impedance is greater than the output impedance of the output driver 34 when transmitting data to the bus 12. It should be noted that when transmitting data to the bus 12, the output impedance of the output driver 34 may be a range of values, or a single value.

The output 56 of the output driver 34 therefore is considered to be "floating" (i.e., the signal line is not driven by a significant signal) which, in this case, produces a high impedance. The series of signals that produce this result thus may be referred to as "float signals," which cause "float logic" to produce this result. Of course, float logic may include a wide variety of configurations that produce the intended result. Accordingly, the specific configurations described herein are illustrative of some embodiments of the invention only.

Returning again to FIG. 5, the process continues to step 410 by disabling power to the slot 14. To that end, the system controller 30 forwards a power-down signal to the power controller 32, which consequently opens the line connecting the slot 14 to its power supply. For example, the power controller 32 may open one or more power transistors positioned between the power source and the slot 14. The user interface then produces some indicia instructing the operator to remove the card 16. The operator therefore can remove the card 16, thus ending the process (step 412).

This process may be executed at any time. For example, the output driver 34 may be actively transmitting data to the bus 12 when this process begins. When the process begins at this time, the output driver 34 finishes forwarding some of the data. Circuitry or other similar functional modules then direct other data, if any, back toward the bridge core logic 40. In some embodiments, the bridge core logic 40 stops forwarding this data at such time.

Figure 6:
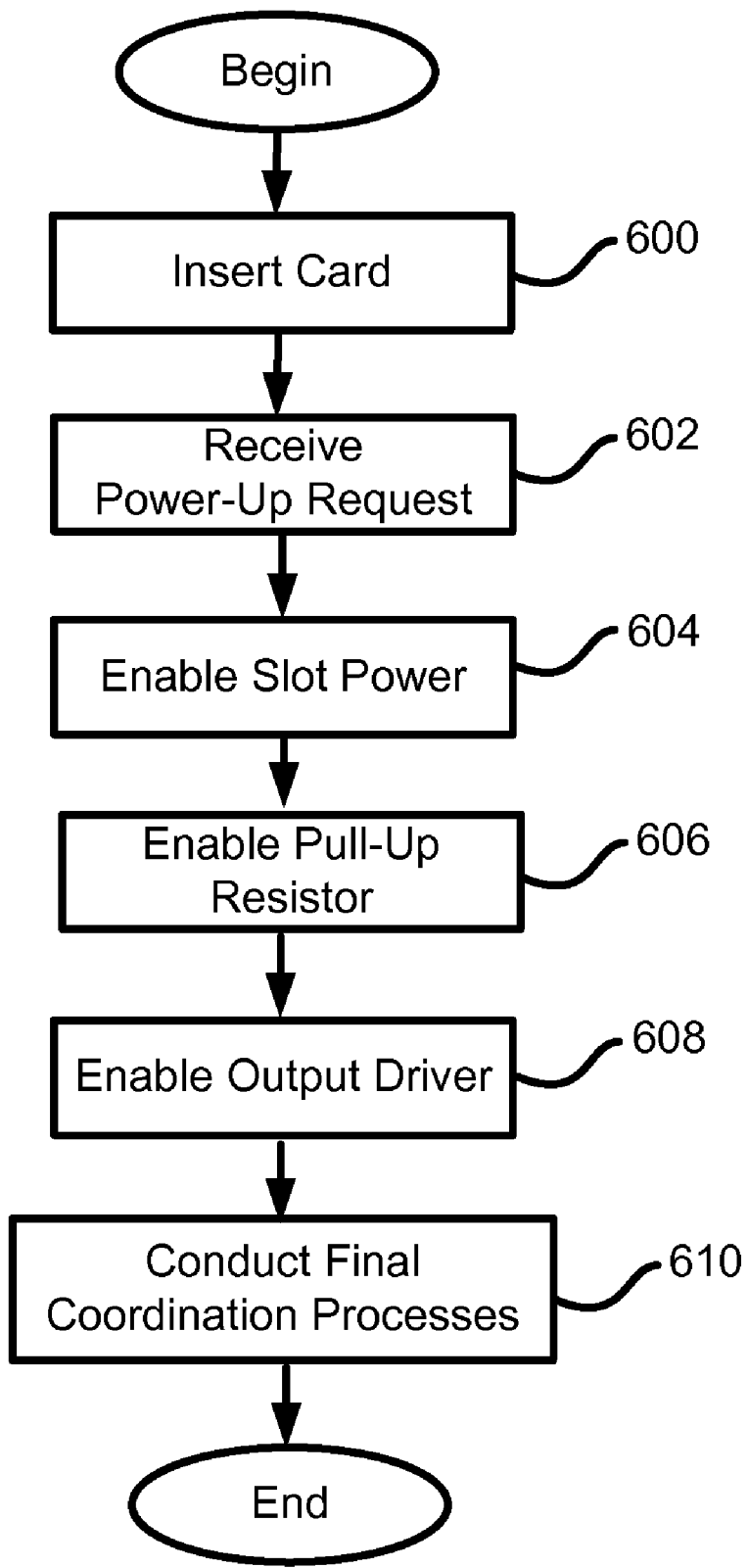
FIG. 6 shows a process of adding a card to a slot in accordance with illustrative embodiments of the invention.

After the slot 14 has been fully powered down and the card 16 is removed as described above, either the original card 16 or a new card may be inserted into the slot 14. FIG. 6 schematically shows one such process, which substantially mirrors the process discussed above with regard to FIG. 4.

The process begins at step 600, when the operator physically inserts the card 16 into the slot 14. Once the card 16 is inserted, in response to commands entered through the user console 20, logic may generate a power up request (step 602) that is transmitted to the operating system and system controller 30.

The system controller 30 then forwards a message to the power controller 32 to energize the slot 14 (step 604). The power controller 32 responsively closes the connection between the power supply in the slot 14, thus providing the requisite power.

The process then continues to step 606, which enables the pull-up resistor 42. To that end, the bridge core logic 40 forwards a close signal that causes the switch 44 to close, effectively adding the pull-up resistor 42 to the circuit. This step thus causes the output impedance of the bus controller 28 to be that of the pull-up resistor 42.

After the pull-up resistor 42 is added to the circuit, the process enables the output driver 34 (step 608). That end, the bridge core logic 40 forwards an enable message to the control register 46 (i.e., in the example discussed, a logical "0"), which in turn forwards the enable message to the enable port 53 of the output driver 34 (see FIGS. 3 and 5). After receiving the enable message, the output driver 34 is capable of forwarding data to the card 16 and thus, is considered to be "enabled."

The process concludes by conducting final coordinating processes (step 610). For example, the multiplexer 50 may reset to its default state of forwarding data from the input driver 38 to the input register 48. As another example, the operating system may execute standard start-up procedures, such as processes to discover hardware and software in the system.

Accordingly, causing the output of the bus controller 28 (i.e., the output 56 of the output driver 34) to have a high impedance effectively isolates the bus controller 28 from the bus 12 when a card 16 is to be swapped. In addition, permitting the bus controller output to float in this manner should substantially mitigate or eliminate potential problems with circuitry that is low active (i.e., active at ground).

Some embodiments of the invention are implemented as a computer program product having a computer usable medium with computer readable program code thereon. The computer readable code may be read and utilized by a computer system in accordance with conventional processes. To that end, rather than, or in addition to, using specific discrete circuitry or application specific integrated circuits, some embodiments may use one or more microprocessors to implement the discussed functionality.

Although the above discussion discloses various exemplary embodiments of the invention, it should be apparent that those skilled in the art can make various modifications that will achieve some of the advantages of the invention without departing from the true scope of the invention.

What is claimed is:

1. A method for controlling the transmission of electrical signals through a pin on a hot plug bus that uses a bus controller, the bus connecting a computer node to a slot capable of accepting a hot plug device, output electrical signals being transmitted from an output port of the computer node to the pin using an output driver, input electrical signals being transmitted from the pin to an input port of the computer node, the method comprising:

in response to determining that the slot should be powered down, simultaneously (a) disabling the transmission of input electrical signals from the pin to the input port and (b) redirecting output electrical signals to the input port to form a loopback between the output port and the input port; and causing the output driver to have a high output impedance, so that the pin is electrically isolated from the computer node.

2. The method of claim 1, wherein determining includes receiving, in the bus controller, a signal having data that indicates that an individual has directed, using a graphical user interface, that the slot should be powered down.

3. The method of claim 1, wherein the bus includes a multiplexer, the output of the multiplexer being coupled to the input port, two inputs of the multiplexer being coupled to the pin and the output port respectively, further wherein simultaneously disabling and redirecting comprises changing the multiplexer input setting from the pin to the output port.

4. The method of claim 1, wherein causing the output driver to have a high output impedance includes disabling the output driver.

5. The method of claim 1, wherein the bus controller includes a pull-up resistor switchably coupled with the pin, the method further electrically isolating the pull-up resistor from the pin after causing the output driver to have a high output impedance.

6. The method of claim 1, wherein the high impedance is greater than about one mega-ohm.

7. A method for controlling the transmission of electrical signals through a pin on a hot plug bus that uses a bus controller, the bus connecting a computer node to a slot capable of accepting a hot plug device, the computer node having an output port and an input port configured to form a loopback, the method comprising:
  in response to determining that the slot should be powered up, causing an output driver to have a low output impedance, so that the output port is electrically connected through the output driver to the pin; and
  simultaneously (a) breaking the loopback between the output port and the input port and (b) enabling the transmission of electrical signals from the pin to the input port.

8. The method of claim 7, wherein determining includes receiving, in the bus controller, a signal having data that indicates that an individual has directed, using a graphical user interface, that the slot should be powered up.

9. The method of claim 7, wherein the bus includes a multiplexer, the output of the multiplexer being coupled to the input port, two inputs of the multiplexer being coupled to the pin and the output port respectively, and wherein simultaneously breaking and enabling comprises changing the multiplexer input setting from the output port to the pin.

10. The method of claim 7, wherein causing the output driver to have a low output impedance includes enabling the output driver.

11. The method of claim 7, wherein the bus controller includes a pull-up resistor switchably coupled with the pin, the method further comprising electrically connecting the pull-up resistor to the pin before causing the output driver to have a low output impedance.

12. The method of claim 7, wherein the high impedance is greater than about one mega-ohm.

13. Apparatus for controlling the transmission of electrical signals through a pin on a hot plug bus, the bus connecting a computer node to a slot capable of accepting a hot plug device, the computer node having an output port and an input port, the apparatus comprising:
  an output driver for transmitting output electrical signals from the output port to the pin;
  an input memory for temporarily storing input electrical signals for transmission to the input port;
  a multiplexer for selecting, for storing in the input memory, either input electrical signals from the pin or output electrical signals, the output of the multiplexer being coupled to the input memory, two inputs of the multiplexer being coupled to the pin and the output port respectively; and
  float logic, responsive to float signals received from the computer node, to control the output driver and to control the multiplexer selection.

14. The apparatus of claim 13, wherein the float logic is configured to respond to a command to power down the slot by:
  controlling the selecting means to select output electrical signals for storing in the input memory; and
  controlling the output driver to have a high output impedance.

15. The apparatus of claim 14, further comprising a graphical user interface configured to generate the command to power down the slot.

16. The apparatus of claim 13, wherein the float logic is configured to respond to a command to power up the slot by:
  controlling the selecting means to select input electrical signals from the pin for storing in the input memory; and
  controlling the output driver to have a low output impedance.

17. The apparatus of claim 16, further comprising a graphical user interface configured to generate the command to power up the slot.

18. The apparatus of claim 13, further including bridge core logic for implementing a bus protocol, the bridge core logic producing the set of float signals.

19. The apparatus of claim 13, wherein the output driver has a transmitting impedance when transmitting signals to the bus and a float impedance when floating, the float impedance being greater than the transmitting impedance.

20. The apparatus of claim 13, wherein the high impedance is greater than about one mega-ohm.

* * * * *